United States Patent Office 3,283,662
Patented Nov. 8, 1966

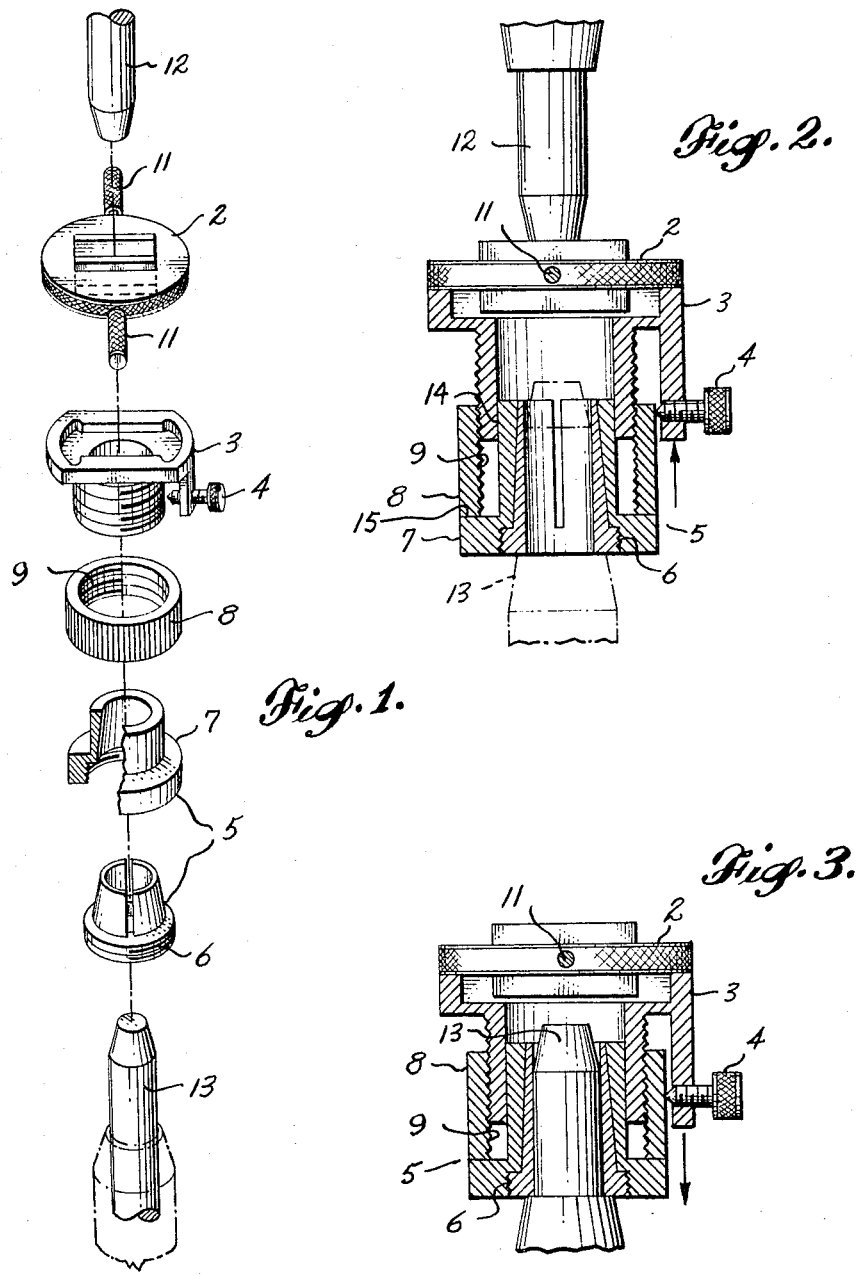

3,283,662
ELECTRODE DRESSING TOOL
Walter Weglin, Seattle, Wash., assignor to The Boeing Company, Seattle, Wash., a corporation of Delaware
Filed Oct. 26, 1964, Ser. No. 406,372
8 Claims. (Cl. 90—12)

This invention relates to welding electrode dressing tools and more particularly to a tool adapted to shape the tip surfaces of opposed axially aligned welding electrodes in a welding apparatus.

In electrical resistance welding it is essential that both electrodes are faced in relation to one another in perfect alignment and furthermore that the surfaces of the welding tips should be in correct relationship to one another in order to produce welds having the required strength.

Refacing electrodes with the known methods requires a high level of skill and often does not provide the required accuracy of contour. Up to the present time, the electrodes were removed from the spot welder and machined to a specified surface. They were replaced in the spot welder, and because the electrode arms do not always align perfectly, the two electrode surfaces still did not match. Face alignment, because of spot welding machine inaccuracies, is difficult to obtain unless both electrodes are faced in relation to each other while both are mounted in the spot welder.

One purpose of the present invention is to help compensate for misalignment inherent in the spot weld machine electrode holders. Another purpose of the present invention is to provide a tool which at the same time will accurately surface the face of the electrodes.

Accordingly, it is an object of the present invention to provide an electrode tip dressing tool which is simple in construction and which will surface each electrode on the welding machine without removing the electrode from the machine.

Another object of the invention is to provide a dressing tool which is capable of visually assisting in aligning the electrodes in perfect relationship with one another whereafter accurately resurfacing of the face of the upper and lower electrode can be achieved with respect to one another.

The above and other novel features of the invention will appear more fully hereinafter from the following detailed description when taken in conjunction with the accompanying drawings, in which:

FIGURE 1 is an exploded isometric view showing the various components of the dressing tool.

FIGURE 2 is a cross-section of the dressing tool while locked in position on the lower electrode and facing the upper electrode for resurfacing.

FIGURE 3 is a cross-section of the assembled tool when positioned over the lower electrode for resurfacing.

In general the dressing tool for welding electrodes comprises a first adjustable supporting means having a flat surface which when locked unto the first or lower electrode provides a perpendicular plane with respect to the axis of the lower electrode. The second supporting means will be supported by the perpendicular flat surface and is further provided with a guiding means located parallel to the flat surface and a vertical adjusting means to raise or lower the guiding means. This guiding means has a cutting member which is slideably located therein and thus when the second supporting means is adjusted so that the tip of the electrode will make contact with the cutting member, a reciprocating action of this member will then produce a flat surface on the electrode tip which will be perpendicular to the longitudinal axis of the electrode. The upper electrode which has been visually aligned with the lower electrode will be lowered and the cutting member raised by the vertical adjusting means so that the tip of the upper electrode will make contact with the cutting member and thus reciprocating action thereof will provide a flat surface that is perpendicular with the longitudinal axis of the upper electrode and this flat surface will be aligned with and parallel to the flat surface of the lower electrode.

Referring now to the drawings wherein like reference characters indicate like parts, there is illustrated in FIGURE 1, in exploded fashion, the dressing tool 1, having a slideable moving cutter 2 guided by a cutter guide 3 which is provided with a fine height locking screw 4. A tapered sleeve assembly 5 having an adjusting member 6 and holding sleeves 7 for adjusting and aligning around the lower electrode. A nut having a straight knurl 8 has an inside threading 9 that corresponds with the threading 10 on the cutting guide 3, for very fine height adjustment purposes. A handle 11 is operably connected to the cutter 3 for producing a sliding motion or circular motion of the cutter 3.

FIGURE 2 shows a cross-section of the assembled dressing tool 1 wherein the cutter 3 is adjacent to the surface tip of the upper electrode 12 while the dressing tool 1 is fastened by its tapered sleeve assembly 5 on the lower electrode 13. The cutter guide 3 is brought upwards by the adjusting feature of the nut 8 so that the cutter 2 is adjacent to the electrode surface of the electrode 12. The fine height locking screw 4 is holding the cutter guide 3 in a stationary adjusted position; however cutter guide 3 can rotate along its vertical axis of rotation thereby sliding about surfaces 14 and 15.

In FIGURE 3 the cutter guide 3 has been brought downward in order to resurface the electrode 13. Cutter guide 3 is set stationary by the fine height locking screw 4 and resurfacing of the lower electrodes 13 can be done.

Having thus described the different parts and their function by reference numbers, the operation of the present invention is as follows:

Without removing the electrodes from the welding machine, the electrodes 12 and 13 should be adjusted so the two electrodes 12 and 13 are in alignment as much as possible with one another before using the dressing tool 1. Dressing tool 1 is then placed over and locked to the bottom electrode 13 while keeping the top electrode 12 in the "up" position. The cutter guide 3 is set in the right position by adjusting the nut 8 and fastened by the fine height locking screw 4. By moving the handle which is attached to the cutter 2 in back and forth strokes the cutter will move over the surface of the bottom electrode 13 and the resufracing will take place. When by visual observation, there appears a new and shiny surface on the face of the bottom electrode 13, it has been resurfaced.

Next, the top electrode 12 is moved down and positioned approximately ½ inch from the bottom electrode 13. With the tapered sleeve assembly 5 still locked on the lower electrode 13, the cutter 2 is raised against the tip of the top electrode 12 by adjusting the nut 8 and by resetting of the fine height locking screw 4. The cutter 2 is moved back and forth until the top electrode 12 rides smoothly against the cutter 2, until a flat surface has been achieved. The top electrode 12 is raised and the dressing tool 1 is removed. The upper and lower electrodes 12 and 13 are now flat in relationship to one another.

By using different shaped cutters 2 either flat or spherical faced electrodes can be produced with the dressing tool 1; however, in addition to the back and forth strokes, a semi-circular movement of the handle must be performed.

It will be understood that this dressing tool will produce accurate resurfacing of the faces of the upper and lower electrodes and in correct relationship to one another while both electrodes are in the spot welding machines. Furthermore, the resurfacing of the electrodes is done quickly and efficiently and does not need a skilled operator in order to accomplish the desired effect.

It should be noted that a modification such as spring loading the cutting member against the electrodes does not depart from the basic concept of the invention disclosed herein.

Although this particular embodiment of the invention has been illustrated and described, it will be obvious to those skilled in the art that various changes and modifications may be made without departing from the invention and it is intended to cover in the appended claims all such changes and modifications as come within the true spirit and scope of the invention.

I claim:
1. A dressing tool for welding electrodes comprising in combination:
   (a) a tapered sleeve assembly adapted to be locked on one electrode and adapted to provide a supporting base having a plane perpendicular to the longitudinal axis of the electrode,
   (b) a cutter guide provided with height adjustment means and guiding means,
   (c) a cutting member slideably positioned in said guiding means, and
   (d) said adjustment means resting with its plane on said perpendicular plane of said supporting base and adapted to position said cutter guide with its slideably positioned cutting member, so that said cutting member can be lowered and raised in a plane perpendicular to, and on, said axis of the electrode.

2. A dressing tool for welding electrodes comprising in combination:
   (a) first adjustable supporting means having a flat surface and locking means for connecting said first adjustable supporting means in stationary relationship with the electrode so that said flat surface is perpendicular about and with the longitudinal axis of the electrode,
   (b) a second supporting means adapted to be supported on said first supporting means perpendicular flat surface about the electrode and having guiding means located in parallel relationship with said flat surface along said longitudinal axis of the electrode,
   (c) said second supporting means provided with height adjusting means for moving said second supporting means adjacent the electrode tip to be resurfaced, and
   (d) a cutter member slideably mounted in said guiding means so that a reciprocating action of said cutter resurfaces the electrode tip when said cutter contacts the electrode tip.

3. A dressing tool for resurfacing the upper and lower welding electrodes being in alignment with one another in a welding apparatus comprising in combination:
   (a) a first supporting means adapted to be positioned about the lower electrode and having an adjustable sleeve and locking means with a surface that extends about the lower electrode when locked therewith so that said surface disposes in perpendicular relationship with respect to the longitudinal axis of the lower electrode,
   (b) a second supporting means adapted to be positioned on said perpendicular plane about the lower electrode and provided with adjusting means and guiding means,
   (c) said adjusting means of said second supporting means capable of positioning said guiding means adjacent the lower electrode tip, and
   (d) a cutter member slideably mounted in said guiding means and in parallel relationship with said perpendicular surface so that motion of said cutter member occurs along a plane perpendicular with the longitudinal axis of the lower electrode and whereby said lower electrode tip becomes resurfaced when said adjusting means has been adjusted to position said cutter member in contact with said lower electrode tip and whereby said upper electrode is resurfaced by motion of said cutter member when said adjusting means has been adjusted to position said cutting member in contact with said upper electrode tip.

4. A dressing tool for resurfacing the upper and lower welding electrodes being in alignment with one another in a welding apparatus as claimed in claim 3 wherein said second supporting means is provided with a means to lock said adjusting means in a fixed position.

5. A dressing tool for resurfacing the upper and lower welding electrodes being in alignment with one another in a welding apparatus as claimed in claim 3 wherein said guiding means is rotationally mounted to said second supporting means so that said cutter member can be rotated on a plane perpendicular to the axis of said lower and said upper electrode.

6. A dressing tool for resurfacing the upper and lower welding electrodes being in alignment with one another in a welding apparatus as claimed in claim 3 wherein said cutter member has a convex cutting plane adapted to produce spherical shaped electrode surface tips.

7. A dressing tool for resurfacing the upper and lower welding electrodes being in alignment with one another in a welding apparatus, comprising in combination:
   (a) a cutter member having opposing abraded surfaces,
   (b) a guiding means for slideably guiding said cutter member,
   (c) a supporting means having an adjustable sleeve and locking member and said supporting means adapted to be locked about the lower electrode by said locking member which locks said adjustable sleeve in tight relationship about the lower electrode,
   (d) said guiding means disposed about said lower electrode and slideably resting on said guiding means for slideable rotation thereof,
   (e) said guiding means provided with height adjusting means and locking screw so that said cutter can be adjusted to contact the lower electrode tip in perpendicular relationship with respect to the longitudinal axis of the lower electrode and fastened by said locking screw whereby rotational movement of said guiding means and reciprocal movement of said cutter member resurfaces the lower electrode tip, and
   (f) whereby the upper electrode is resurfaced by said movements when said cutter member is brought in contact with the upper electrode tip when said height adjusting means and locking screw are readjusted and reset.

8. A dressing tool for resurfacing the upper and lower welding electrodes being in alignment with one another in a welding apparatus as claimed in claim 7 wherein said cutter member has opposing abraded convex surfaces in order to produce a spherical electrode tip.

No references cited.

WILLIAM W. DYER, JR., *Primary Examiner.*

LEONIDAS VLACHOS, *Examiner.*